(12) United States Patent
Kannan et al.

(10) Patent No.: US 11,055,652 B1
(45) Date of Patent: Jul. 6, 2021

(54) SYSTEM FOR SHARING DETECTION LOGIC THROUGH A CLOUD-BASED EXCHANGE PLATFORM

(71) Applicant: Anvilogic, Inc., Palo Alto, CA (US)

(72) Inventors: Karthik Kannan, Los Altos Hills, CA (US); Deb Banerjee, Cupertino, CA (US)

(73) Assignee: ANVILOGIC, INC., Palo Alto, CA (US)

( * ) Notice: Subject to any disclaimer, the term of this patent is extended or adjusted under 35 U.S.C. 154(b) by 0 days.

(21) Appl. No.: 16/953,701

(22) Filed: Nov. 20, 2020

Related U.S. Application Data

(60) Provisional application No. 62/939,442, filed on Nov. 22, 2019.

(51) Int. Cl.
| | |
|---|---|
| *H04L 9/00* | (2006.01) |
| *G06Q 10/06* | (2012.01) |
| *G06Q 10/10* | (2012.01) |
| *G06Q 30/02* | (2012.01) |
| *G06Q 50/00* | (2012.01) |
| *G06N 20/00* | (2019.01) |
| *G06N 5/04* | (2006.01) |
| *H04L 29/06* | (2006.01) |
| *H04L 29/08* | (2006.01) |

(52) U.S. Cl.
CPC ......... *G06Q 10/06395* (2013.01); *G06N 5/04* (2013.01); *G06N 20/00* (2019.01); *G06Q 10/067* (2013.01); *G06Q 10/0635* (2013.01); *G06Q 10/10* (2013.01); *G06Q 30/0201* (2013.01); *G06Q 50/01* (2013.01); *H04L 63/0428* (2013.01); *H04L 63/1433* (2013.01); *H04L 63/1441* (2013.01); *H04L 67/10* (2013.01); *G06Q 2220/00* (2013.01)

(58) Field of Classification Search
CPC .... H04L 63/1441; H04L 63/1433; G06N 5/04
See application file for complete search history.

(56) References Cited

U.S. PATENT DOCUMENTS

| | | | |
|---|---|---|---|
| 9,288,220 B2 * | 3/2016 | Raugas | G06N 20/00 |
| 9,690,938 B1 * | 6/2017 | Saxe | G06N 3/0454 |
| 9,990,495 B2 * | 6/2018 | Parinov | H04L 63/1408 |
| 1,020,573 A1 | 2/2019 | Apostolopoulos | |

(Continued)

OTHER PUBLICATIONS

Co-pending U.S. Appl. No. 16/953,696, inventors Kannan; Karthik et al., filed Nov. 20, 2020.

*Primary Examiner* — Beemnet W Dada
(74) *Attorney, Agent, or Firm* — Wilson Sonsini Goodrich & Rosati

(57) ABSTRACT

Described are platforms, systems, and methods for sharing detection logic through a cloud-based exchange platform. In one aspect, a method comprises receiving detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to an interface.

29 Claims, 12 Drawing Sheets

(56) References Cited

U.S. PATENT DOCUMENTS

| | | | |
|---|---|---|---|
| 10,659,333 B2 * | 5/2020 | Sartran | H04L 43/0876 |
| 10,692,032 B2 | 6/2020 | Datta Ray | |
| 10,785,247 B2 * | 9/2020 | Nikolaev | H04L 43/0876 |
| 10,831,891 B2 * | 11/2020 | Chistyakov | G06F 21/56 |
| 10,878,090 B2 * | 12/2020 | Chistyakov | G06N 20/00 |
| 2015/0058984 A1 * | 2/2015 | Shen | G06F 21/568 |
| | | | 726/23 |
| 2016/0330219 A1 | 11/2016 | Hasan | |
| 2019/0260783 A1 | 8/2019 | Humphrey et al. | |
| 2020/0251117 A1 * | 8/2020 | Xu | G06N 20/10 |

\* cited by examiner

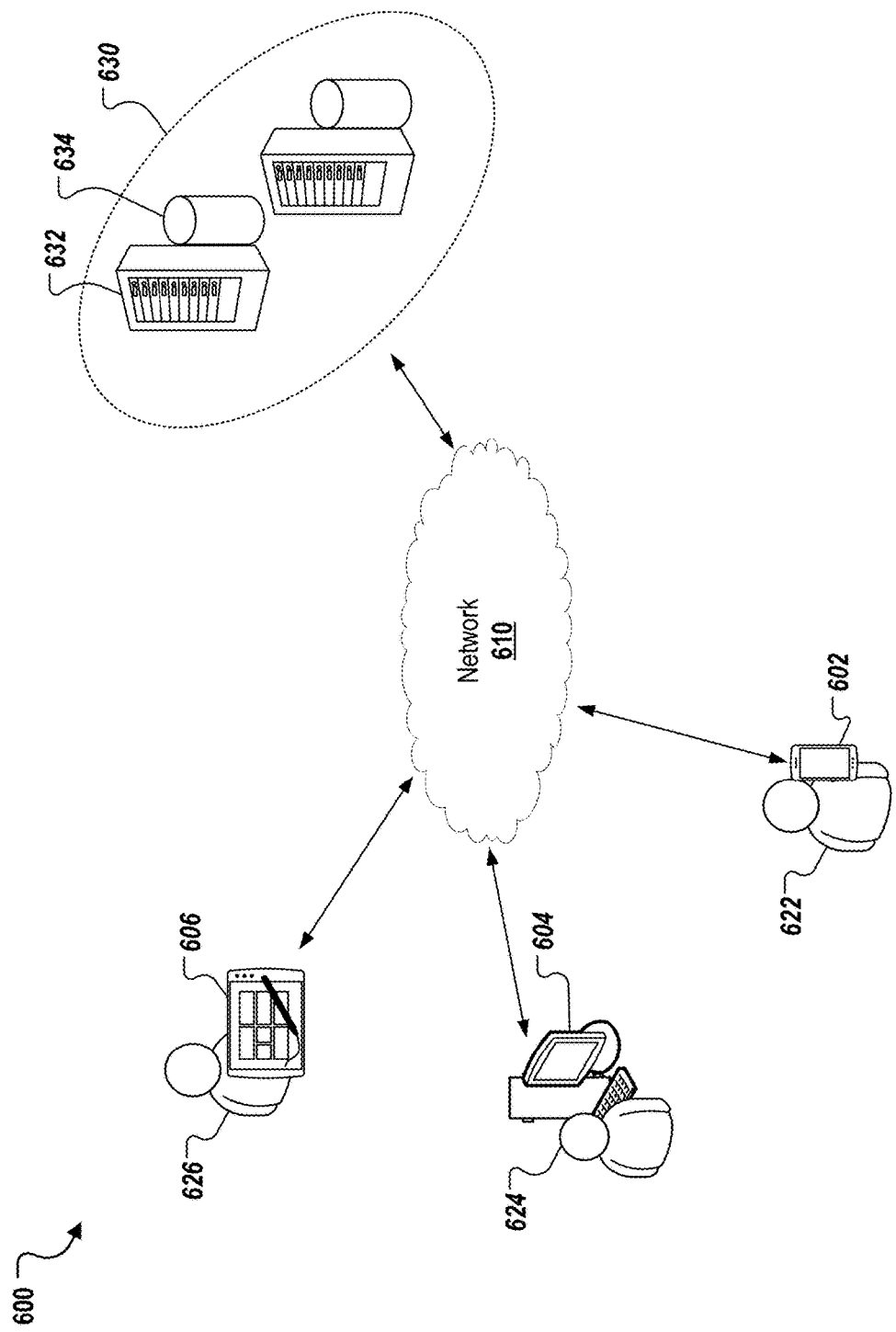

SYSTEM FOR SHARING DETECTION LOGIC THROUGH A CLOUD-BASED EXCHANGE PLATFORM

CROSS-REFERENCE TO RELATED APPLICATIONS

This application claims the priority and benefit of U.S. Provisional Application No. 62/939,442, filed Nov. 22, 2019, and entitled: SYSTEM FOR SHARING DETECTION LOGIC THROUGH A CLOUD-BASED EXCHANGE PLATFORM, the entire content of which is incorporated herein by reference in its entirety.

BACKGROUND

Cyber security includes technologies, processes, and practices designed to protect networks, devices, programs, users and data from attack, damage, theft or unauthorized access. The need for increased effectiveness and efficiencies in cyber security has increased as there are more devices within corporate networks as well as connected to the internet than ever before and, organizations (e.g., government, military, corporate, financial, medical, and so forth) collect, process, and store unprecedented amounts of data on such devices. Moreover, a significant portion of stored data includes sensitive information, such as intellectual property, financial data, personal information, and so forth. As such, unauthorized access or exposure to sensitive information can have negative consequences. As the volume and sophistication of cyber-attacks grow, enterprises, especially those that are tasked with safeguarding information relating to intellectual property, identity, national security, health, or financial records, must to take steps to protect sensitive business and personnel information.

SUMMARY

Embodiments of the present disclosure are generally directed to a system that provides a cloud-based platform for sharing of detection logic among enterprises that are grouped as a trusted (peer) group, and optionally, across a wider subscriber group. The detection logic is processed through trained machine-learning models that curate and improve the detection logic.

Enterprise systems and services are constantly under attack by many adversaries using a variety of threats that are characterized by their tactics, techniques, and procedures (TTP's). Enterprises defenses use many different preventive security products and services that block threats. Enterprises also have detective security products and services that alert for suspicious activity when those threats have breached enterprise defenses. Detection security products include, for example, Security Incident and Event Management (SIEM) products, and Endpoint Detection and Response (EDR) and Network Detection and Response (NDR) products. These products can require detection rules to be deployed that inspect many different security event sources and security event types to trigger an alert when a rule fires.

Moreover, enterprise security analysts have challenges in identifying what threats to prepare for, and how to define, develop, and implement a security rule for a specific threat. Enterprise security may employ knowledge of the TPPs that the threat uses and the events that those TTP's generate to write a rule that fires and creates an alert only when a threat executes in the enterprise's environment. Additionally, enterprise security analysts attempt to ensure that detection rules do not fire under other benign conditions causing a false positive (FP), which wastes time in the triage and investigate the FP event. Exceptions to the detection rule can be written such that FP's are minimized or eliminated. Further, the information provided to enterprise security analysts should include the most relevant threats as well as a prioritization of such threats to the respective enterprise in order for these threats to be prioritized appropriately.

Furthermore, in most instances Cyber-security organization (SOC) teams work independently to solve the same problems that their peers in other enterprises are also attempting to solve. In such instances, these SOC teams work without the benefit of sharing their approaches, which could potentially help solve the problem quicker and more efficiently and effectively.

The concept of sharing techniques among trusted partners to battle a common problem is absent in cyber-security as well as the automation underpinnings of a SOC. Moreover, SOC organizations may employ custom implementations of various STEM products, such as Splunk™, International Business Machines (IBM) QRadar™, Hewlett-Packard (HP) Aresight™, and so forth, as well as custom coded versions of rules on such platforms. In some instances, these rules are coded using a proprietary language (e.g., Splunk Processing Language (SPL)). Additionally, there is often little to no portability across platforms, no ability to share amongst users of a STEM across companies, and no framework(s) or methodologies to share detection logic. Furthermore, SOC teams do not have trusted technology to help them communicate and collaborate with experts or peers in the community about detecting or blocking threats, or about response actions that can help sharpen their operations as well as lead to automation.

In one aspect, disclosed herein are systems for sharing detection logic through a cloud-based exchange. The systems comprise: an interface; one or more processors; and a computer-readable storage device coupled to the one or more processors and having instructions stored thereon which, when executed by the one or more processors, cause the one or more processors to perform operations that provide the cloud-based exchange, the operations comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to the interface. In some embodiments, the operations comprise: before processing the standardized detection logic through the machine-learning model: receiving, from at least one other enterprise, the active telemetry regarding the performance of the detection logic in the operating environment. In some embodiments, the operating environment is associated with the at least one other enterprise; and training the machine-learning model with the active telemetry to model the efficacy and usefulness of the detection logic. In some embodiments, the operations comprise: receiving, from the at least one other enterprise, environmental and preferential data; and training the machine-learning model with the environmental and preferential data. In some embodiments, the environmental and preferential data includes data sources in an environment associated with the at least one other enterprise, security priorities vis-à-vis a framework, market trends, or efficacy ratings. In some embodiments, the operations comprise: receiving, from the at least one other enterprise, behavior data regarding user interaction with the detection logic; and training the machine-learning model with the behavior data. In some embodiments, the behavior data comprises usage of the detection logic, topics of interest regarding the detection, and popularity metric for the detection. In some embodiments, curating and improving the detection logic comprises generating conversion and conformance of the detection logic in a vendor-neutral format. In some embodiments, curating and improving the detection logic comprises testing the detection logic for validity and efficacy. In some embodiments, the efficacy of the detection logic includes a high signal and a low rate of false positives. In some embodiments, curating and improving the detection logic comprises curating for better efficiency in a construction of the detection logic and fine-tuning for a precision of the detection logic in detecting valid threats. In some embodiments, curating and improving the detection logic comprises converting the detection logic to at least one end-user Security Incident and Event Management (SIEM) tool format. In some embodiments, the operations comprise: training the machine-learning model with the standardized detection logic and the active telemetry. In some embodiments, the active telemetry includes common factors, and successful uses of the protection techniques. In some embodiments, the operations comprise: analyzing the active telemetry and the detection logic to determine metadata regarding the attacks and respective protection techniques; and providing the metadata to the interface. In some embodiments, the metadata includes usage patterns, search terms, popularity, efficacy, usability, user reviews, ratings, or rankings. In some embodiments, the standardized detection logic and the active telemetry are provided to the interface in a common format. In some embodiments, the standardized detection logic and the active telemetry are provided to the interface in vendor-specific format. In some embodiments, standardizing the detection logic comprises translating vendor-specific formats into a common language. In some embodiments, the protection techniques include detection rules. In some embodiments, the detection logic is provided by a software service installed at the enterprise. In some embodiments, the detection logic is provided by a security appliance installed at the enterprise. In some embodiments, the security appliance extracts the detection logic from various sources. In some embodiments, the security appliance masks confidential or private data included in the detection logic. In some embodiments, the security appliance masks data by tokenizing or encrypting the data. In some embodiments, the detection logic is received by a cloud-based service. In some embodiments, the detection logic is non-attributable to the enterprise. In some embodiments, the detection logic is attributable to the enterprise based on a permission provide by the enterprise. In some embodiments, the standardized detection logic and the active telemetry are provided only to member enterprises of a trusted peer group as determined by the enterprise. In some embodiments, the detection logic includes a plurality of detection rules associated with cyber threat detection. In some embodiments, the detection rules include triage for false positives. In some embodiments, the detection rules include logic to mitigate or eradicate the cyber threat. In some embodiments, the detection logic includes customizations to the detection rules. In some embodiments, the detection logic includes context data regarding a deployment environment. In some embodiments, the detection logic includes incident response data. In some embodiments, the interface comprises a user-interface. In some embodiments, the user-interface is provided through a console.

In another aspect, disclosed herein are non-transitory computer-readable storage media coupled to one or more processors and having instructions stored thereon which, when executed by the one or more processors, cause the one or more processors to perform a operations comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to the interface. In some embodiments, the operations comprise: before processing the standardized detection logic through the machine-learning model: receiving, from at least one other enterprise, the active telemetry regarding the performance of the detection logic in the operating environment. In some embodiments, the operating environment is associated with the at least one other enterprise; and training the machine-learning model with the active telemetry to model the efficacy and usefulness of the detection logic. In some embodiments, the operations comprise: receiving, from the at least one other enterprise, environmental and preferential data; and training the machine-learning model with the environmental and preferential data. In some embodiments, the environmental and preferential data includes data sources in an environment associated with the at least one other enterprise, security priorities vis-à-vis a framework, market trends, or efficacy ratings. In some embodiments, the operations comprise: receiving, from the at least one other enterprise, behavior data regarding user interaction with the detection logic; and training the machine-learning model with the behavior data. In some embodiments, the behavior data comprises usage of the detection logic, topics of interest regarding the detection, and popularity metric for the detection. In some embodiments, curating and improving the detection logic comprises generating conversion and conformance of the detection logic in a vendor-neutral format. In some embodiments, curating and improving the detection logic comprises testing the detection logic for validity and efficacy. In some embodiments, the efficacy of the detection logic includes a high signal and a low rate of false positives. In some embodiments, curating and improving the detection logic comprises curating for better efficiency in a construction of the detection logic and fine-tuning for a precision of the detection logic in detecting valid threats. In some embodiments, curating and improving the detection logic comprises converting the detection logic to at least one end-user Security Incident and Event Management (SIEM) tool format. In some embodiments, the operations comprise: training the machine-learning model with the standardized detection logic and the active telemetry. In some embodiments, the active telemetry includes common factors, and successful uses of the protection techniques. In some embodiments, the operations comprise: analyzing the active telemetry and the detection logic to determine metadata regarding the attacks and respective protection techniques; and providing the metadata to the interface. In some embodiments, the metadata includes usage patterns, search terms, popularity, efficacy, usability, user reviews, ratings, or rankings. In some embodiments, the standardized detection logic and the active telemetry are provided to the interface in a common format. In some embodiments, the standardized detection logic and the active telemetry are provided to the interface in vendor-specific format. In some embodiments, standardizing the detection logic comprises translating vendor-specific formats into a common language. In some embodiments, the protection techniques include detection rules. In some embodiments, the detection logic is provided by a software service installed at the enterprise. In some embodiments, the detection logic is provided by a security appliance installed at the enterprise. In some embodiments, the security appliance extracts the detection logic from various sources. In some embodiments, the security appliance masks confidential or private data included in the detection logic. In some embodiments, the security appliance masks data by tokenizing or encrypting the data. In some embodiments, the detection logic is received by a cloud-based service. In some embodiments, the detection logic is non-attributable to the enterprise. In some embodiments, the detection logic is attributable to the enterprise based on a permission provide by the enterprise. In some embodiments, the standardized detection logic and the active telemetry are provided only to member enterprises of a trusted peer group as determined by the enterprise. In some embodiments, the detection logic includes a plurality of detection rules associated with cyber threat detection. In some embodiments, the detection rules include triage for false positives. In some embodiments, the detection rules include logic to mitigate or eradicate the cyber threat. In some embodiments, the detection logic includes customizations to the detection rules. In some embodiments, the detection logic includes context data regarding a deployment environment. In some embodiments, the detection logic includes incident response data. In some embodiments, the interface comprises a user-interface. In some embodiments, the user-interface is provided through a console.

In another aspect, disclosed herein are computer-implemented methods for sharing detection logic through a cloud-based exchange platform, the method being executed by one or more processors and comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to an interface. In some embodiments, the methods comprise: before processing the standardized detection logic through the machine-learning model: receiving, from at least one other enterprise, the active telemetry regarding the performance of the detection logic in the operating environment. In some embodiments, the operating environment is associated with the at least one other enterprise; and training the machine-learning model with the active telemetry to model the efficacy and usefulness of the detection logic. In some embodiments, the methods comprise: receiving, from the at least one other enterprise, environmental and preferential data; and training the machine-learning model with the environmental and preferential data. In some embodiments, the environmental and preferential data includes data sources in an environment associated with the at least one other enterprise, security priorities vis-à-vis a framework, market trends, or efficacy ratings. In some embodiments, the methods comprise: receiving, from the at least one other enterprise, behavior data regarding user interaction with the detection logic; and training the machine-learning model with the behavior data. In some embodiments, the behavior data comprises usage of the detection logic, topics of interest regarding the detection, and popularity metric for the detection. In some embodiments, curating and improving the detection logic comprises generating conversion and conformance of the detection logic in a vendor-neutral format. In some embodiments, curating and improving the detection logic comprises testing the detection logic for validity and efficacy. In some embodiments, the efficacy of the detection logic includes a high signal and a low rate of false positives. In some embodiments, curating and improving the detection logic comprises curating for better efficiency in a construction of the detection logic and fine-tuning for a precision of the detection logic in detecting valid threats. In some embodiments, curating and improving the detection logic comprises converting the detection logic to at least one end-user Security Incident and Event Management (SIEM) tool format. In some embodiments, the methods comprise: training the machine-learning model with the standardized detection logic and the active telemetry. In some embodiments, the active telemetry includes common factors, and successful uses of the protection techniques. In some embodiments, the methods comprise: analyzing the active telemetry and the detection logic to determine metadata regarding the attacks and respective protection techniques; and providing the metadata to the interface. In some embodiments, the metadata includes usage patterns, search terms, popularity, efficacy, usability, user reviews, ratings, or rankings. In some embodiments, the standardized detection logic and the active telemetry are provided to the interface in a common format. In some embodiments, the standardized detection logic and the active telemetry are provided to the interface in vendor-specific format. In some embodiments, standardizing the detection logic comprises translating vendor-specific formats into a common language. In some embodiments, the protection techniques include detection rules. In some embodiments, the detection logic is provided by a software service installed at the enterprise. In some embodiments, the detection logic is provided by a security appliance installed at the enterprise. In some embodiments, the security appliance extracts the detection logic from various sources. In some embodiments, the security appliance masks confidential or private data included in the detection logic. In some embodiments, the security appliance masks data by tokenizing or encrypting the data. In some embodiments, the detection logic is received by a cloud-based service. In some embodiments, the detection logic is non-attributable to the enterprise. In some embodiments, the detection logic is attributable to the enterprise based on a permission provide by the enterprise. In some embodiments, the standardized detection logic and the active telemetry are provided only to member enterprises of a trusted peer group as determined by the enterprise. In some embodiments, the detection logic includes a plurality of detection rules associated with cyber threat detection. In some embodiments, the detection rules include triage for false positives. In some embodiments, the detection rules include logic to mitigate or eradicate the cyber threat. In some embodiments, the detection logic includes customizations to the detection rules. In some embodiments, the detection logic includes context data regarding a deployment environment. In some embodiments, the detection logic includes incident response data. In some embodiments, the interface comprises a user-interface. In some embodiments, the user-interface is provided through a console.

Particular embodiments of the subject matter described in this disclosure can be implemented so as to realize one or more of the following advantages. In addition to originally-created detection logic, the described system receives detection logic from various enterprises and employs machine learning to provide a prioritized a customized list of the most relevant security threats as well as recommend detection rules for such threat to partner enterprises. In some embodiments, a machine-learning model is trained to quantify the compounding impact of individual elements from the received detection logic data as it related to individual enterprises.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 6A depicts a non-limiting example environment that can be employed to execute embodiments of the present disclosure;

DETAILED DESCRIPTION

Figure 1A:
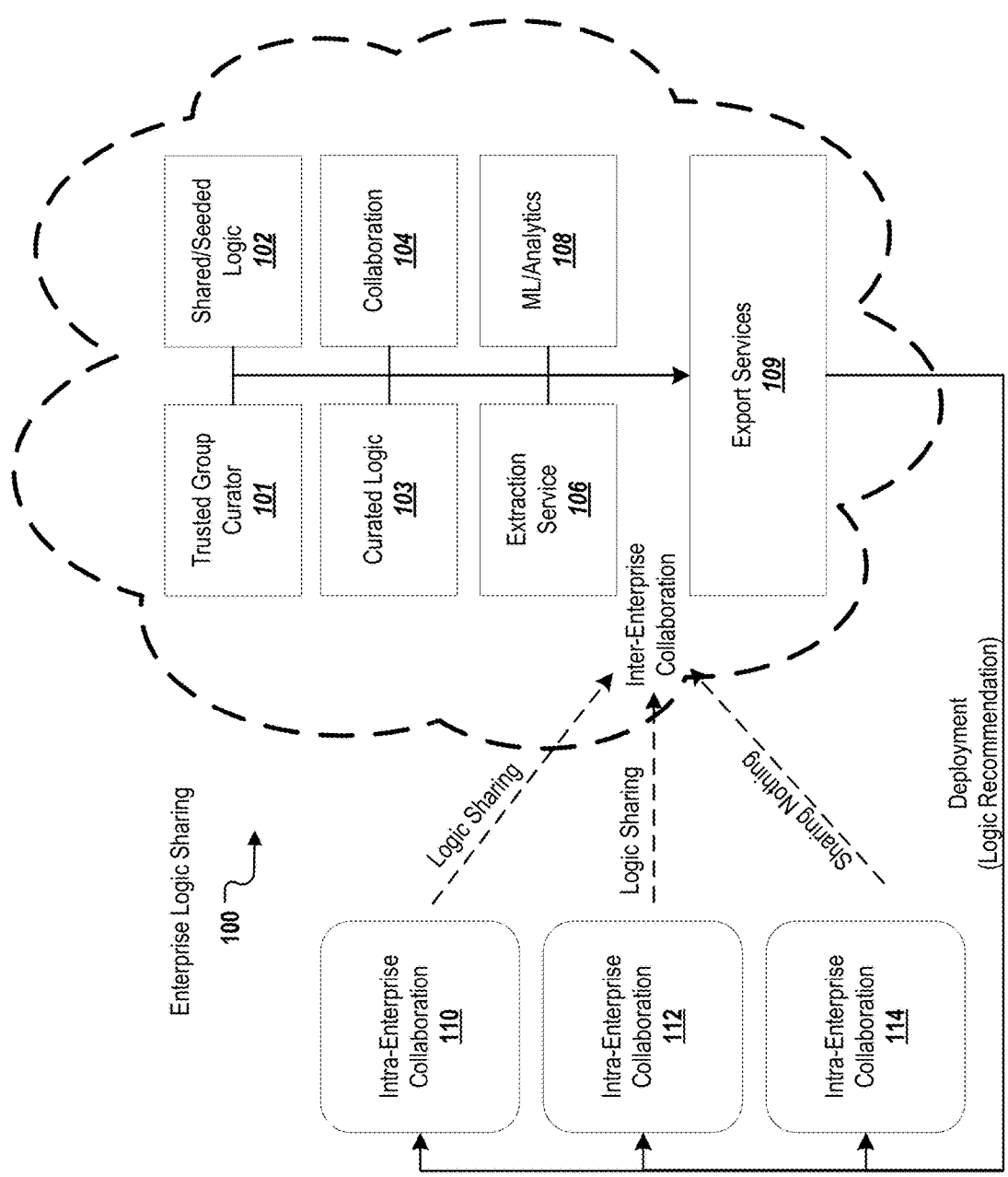
FIG. 1A depicts a non-limiting example of logic sharing among enterprises.

Described herein, in certain embodiments, are systems for sharing detection logic through a cloud-based exchange. The systems comprise: an interface; one or more processors; and a computer-readable storage device coupled to the one or more processors and having instructions stored thereon which, when executed by the one or more processors, cause the one or more processors to perform operations that provide the cloud-based exchange, the operations comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to the interface.

Also described herein, in certain embodiments, are non-transitory computer-readable storage media coupled to one or more processors and having instructions stored thereon which, when executed by the one or more processors, cause the one or more processors to perform operations comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to the interface.

Also described herein, in certain embodiments, are computer-implemented methods for sharing detection logic through a cloud-based exchange platform, the method being executed by one or more processors and comprising: receiving, detection logic from an enterprise; standardizing the detection logic based on a plurality of security frameworks to define attacks and classify protection techniques; processing the standardized detection logic through a machine-learning model to curate and improve the detection logic, the machine-learning model trained with active telemetry regarding a performance of the detection logic in an operating environment; and providing the standardized detection logic and the active telemetry to an interface.

Vulnerabilities, such as defects within a software system, can be leveraged to force software to act in unintended ways (e.g., gleaning information about the current security defenses in place). Exploits are the means through which a vulnerability can be leveraged for malicious activity. A threat refers to the hypothetical event wherein an attacker uses the vulnerability. A threat typically has an exploit involved, which is implemented through software. Hackers may use multiple exploits at the same time.

Cyber security includes high level security domains, such as prevention, e-mail security, and endpoint security, and cloud security, where threats are detected, identified, and handled by a security team working within an enterprise. As such, security teams collect events from various sources within a respective enterprise. Events may be detected from, for example, endpoints, networks, clouds, using detection rules. Such detection rules may be employed to determine whether an enterprise has been breached. For example, an alert may be sent to a security team based on detection of a pattern of network traffic. Triage of detected alerts includes, for example, steps to mitigate and/or eradicate the detected threat. Triage may also include steps to handle false positives. For example, once detected, the incident response (which is separate from triage) based on by the security team by employing a set of incidence response rules. Vendors may supply enterprises with rules for all of the above—detection, alert triage, false positive tuning and incident response; however, these must be tailored to function within the particular aspects of each enterprise. This customization is very unique and specific to industries, verticals, and environments.

One other issue with cyber security is that the software and hardware environments of an enterprise are finite and thus a finite amount of data can be stored and processed at one time. As such, only a certain number of detection rules may be run at a time. Therefore, guidance as to use the most relevant rules for the enterprise's particular threat landscape is invaluable to security teams and their respective enterprise.

Certain Definitions

Unless otherwise defined, all technical terms used herein have the same meaning as commonly understood by one of ordinary skill in the art to which this disclosure belongs.

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, the term 'logic' includes the detection rules associated with cyber threat detection. Logic may also include context about an environment and various analytics, such as usage, performance, and other meta-data, which makes the logic even more usable in the context of a SOC workflow. Logic can also include the logic for alert triage, false positive tuning, and incident response.

As used herein, the term 'meta-data' includes ratings, rankings, context, feedback, and so forth.

As used herein, the term 'threat landscape' or 'enterprise threat landscape' includes a set of adversaries and the tactics, techniques, and procedures employed by these adversaries to attack an enterprise(s) with a variety of TTPs. In some embodiments, the threat landscape includes vulnerabilities in an enterprise as well as information technology (IT) asset criticality, which may be employed to identify threat procedures that require detection rules. In some embodiments, threat frameworks, such as Mitre adversarial tactics, techniques, and common knowledge (ATT&CK)™, may be employed to organize these adversaries and TTPs and associate detection rules to indicate coverage.

As used herein, the term 'detection rule' is a rule that can be employed to detect one or more threat procedures. There are many threat procedures that enterprises must sift through to prioritize associated detection rules. In some embodiments, the described system determines the high priority threat procedures for which security analysts must develop rules. In some embodiments, a detection rule detects a pattern amongst one or more different log sources. For example, in a Windows™ system, a STEM can collect process-launch events with command line arguments, and powershell logs. A rule against these events could alert for the presence of a specific process (e.g., by path name) being launched with a specified argument, and then check whether the powershell result event has a certain field in the same host and within a small (e.g., 1 minute) time window.

As used herein, the term exchange platform includes a cloud hosted platform that allows enterprises to share logic with other enterprises. The cloud service allows enterprises to offer their logic for sharing with other enterprises.

As used herein, the term trusted group of an enterprise includes the set of enterprises that is considered trusted by the enterprise so that all of these enterprises can share logic with each other. In some embodiments, enterprises are allowed to control which logic they may choose to share with other enterprises in their trusted group.

System for Providing a Cloud-Based Exchange Platform for Sharing Detection Logic Embodiments of the present disclosure are generally directed to systems, platforms, and methods for sharing detection logic through a cloud-based exchange platform. In some embodiments, detection logic that is received from an enterprise is standardized according to various security frameworks to define attacks and classify protection techniques. In some embodiments, the standardized detection logic is processed through machine-learning models that have been trained with active telemetry regarding a performance of the detection logic in an operating environment. In some embodiments, the trained machine-learning model curates and improves the standardized detection logic by, for example, generating conversion and conformance of the detection logic in a vendor-neutral format, testing the detection logic for validity and efficacy, curating for better efficiency in the construction of the detection logic, fine-tuning for a precision of the detection logic in detecting valid threats, converting the detection logic to particular format, and so forth.

In some embodiments, the described system provides secure and trusted detection logic sharing amongst enterprises with context and peer analytics through an exchange platform. In some embodiments, the described system is provided through a cloud-based, enterprise-class exchange platform. The concept, which is similar to 'crowd-sourcing', is provided through the described system for the core of cyber-security threat detection. In some embodiments, the described system leverages the combined intelligence of the enterprise community in a healthy, exchange of detection logic and other key analytics to solve the problem of multitudes of islands of tools being inadequate in security defense. In some embodiments, the described system employs artificial intelligence and machine learning to extract and curate the effective techniques. In some embodiments, the described system employs this collective information to equip SOC analysts to fight cyber-attacks.

In some embodiments, through the described system, rules, and context are shared with trusted, peer groups. For example, enterprises can identify a set of other enterprises as "trusted" and with whom they mutually share detection rules as well as supporting context(s). Such contexts can include threat associations, telemetry, efficacy, incident response, and so forth. In some embodiments, other enterprises can be considered "peer" based on a defined vertical, geography, size, and so forth. In some embodiments, a subset of a context, such as meeting enterprise privacy and non-attributability requirements, is shared within a peer group. In some embodiments, a subset of a context may be provided in a form that is suitably anonymized. For example, if an employee or customer name is provided as part of a file path or a host name in the security logic being shared, or a sensitive workload name is provided in the shared security logic, then enterprises can choose to select those strings for anonymization so that those names are kept private.

In some embodiments, the described system determines a supporting context for a respective incident based on rules and telemetry, the specific threat for the incident, and a response to the incident. In some embodiments, detection security products, such as the SIEM, used by an enterprise is source for rules, their usage, and their efficacy telemetry. In some embodiments, detection rules are stored in the STEM. In some embodiments, various usages, such as first used, last used, frequency of alerts generated over time, and so forth, are also usually available in the SIEM instance. In some embodiments, a rule may go through a series of incremental steps to reduce the FP and false negatives (FN). In some embodiments, these steps may also be available in the STEM or ticketing system used to track the progress of developing the rule.

In some embodiments, other context, such as a specific threat for which a detection rule is developed, is received or otherwise acquired from various security tools. Such tools may include, for example, ticketing systems (including those provided by the STEM vendor), Jira™, ServiceNow™, in-house developed workflow tools, and spreadsheets stored in various document servers. In some embodiments, the described system receives information regarding responses to various security incidences. In some embodiments, these responses include a result of a specific detection rule(s) firing. In some embodiments, the outcome of such a process may be stored in and received/retrieved from other tools, such as ticketing systems provided by the SIEM vendor or a third party, such as Jira and ServiceNow.

In some embodiments, the described system may determine the success and failure of enterprises in deploying and operating detection rules, and the outcomes of responses to incidents over sustained periods of time to train machine learning models to improve detection rule recommendations over time.

In some embodiments, the described system may employ the threat context associated with detection rules to identify a relevant rule set(s). In some embodiments, the described system may employ usage telemetry and efficacy from each of the enterprises that are contributing to the ranking of the list of relevant rules.

In some embodiments, enriched logic determined by the described system is provided to empower SOC analysts to fight cyber-attacks with the best-known techniques rather than struggle to find their own potentially inadequate and time-consuming solutions. In some embodiments, the described system generates cross-industry analytics about logic efficacy, best practices, usage telemetry, and so forth. In some embodiments, industry frameworks, such as MITRE ATT&CK, are leveraged to provide standardized ways of defining attack and protection techniques. In some embodiments, the provide exchange platform facilitates sharing among enterprise within a trusted group with non-attributability to source such that the author/contributor's identity is preserved in confidence unless they choose to reveal themselves. Further, sharing may be done within trusted groups which are comprised of members chosen by an individual or group of subscribers such that sharing of information is done without concern of breach of confidentiality and privacy.

In some embodiments, security analysts provide a query to the described system that includes a specific threat. The system may provide a recommendation for a rule or a list of rules to detect the specified threat based on the provided query. In some embodiments, the rules are provided as a ranked list of recommendations, where the ranking is determined by a set of criteria, such as effectiveness, false positive history, how recently the rule has been updated/verified, or feedback provided by the security analysts within a trusted, peer group. In some embodiments, rules or list of rules are provided automatically to security analysts based on, for example, observations of rule deployments and detections within trusted, peer groups.

In some embodiments, the described system determines a ranked set of rules for a threat. In some embodiments, a threat can be associated with one or more categories ("phase", "tactic", "technique") chosen from various threat frameworks, such as Mitre ATT&CK Kill Chain™, or control frameworks such as Center for Internet Security (CIS)20™. In some embodiments, the described system provides a ranked list of rules that have the most impact for detecting a threat for specific category provided by an enterprise. Alternatively, in some embodiments a security analyst may query the described system for detection rules for a specific threat exploit. In some embodiments, the described system provides the rules for the specific exploit.

In some embodiments, the enriched logic provide through the described system includes supporting information, such as content and context necessary to detect threats. In some embodiments, the enriched logic includes rules, which can be in the form of simple or complex correlations. In some embodiments, these rules are constructed via SIEM interfaces. In some embodiments, the enriched logic includes rules aided by statistics. For example, many SIEMs provide the construct to run statistical models and add the results to rules. In some embodiments, the enriched logic includes code, which is programmable logic. In some embodiments, this programmable logic cannot be built in simple rules interfaces as it may be complex and rely on, for example, many inputs, supervision and learning. In some embodiments, the complex programming logic may include stored procedures or machine learning algorithms.

FIG. 1A depicts an example 100 of logic sharing among enterprises. As depicted, each of the enterprises may share logic determined from intra-enterprise collaborations 110, 112, and 114. In some instances, an enterprise may not share any logic, such as from the intra-enterprise collaboration 114. As depicted, the described system provides secure, context-sensitive, and private enterprise threat detection logic-oriented collaboration. Such collaboration may include selective collaboration within smaller, trusted groups, such as the formed by the intra-enterprise collaborations 110, 120, and 130. In some embodiments, allows for collaboration among colleagues within the same enterprise as well as amongst subscribers at other enterprise.

The depicted system includes trusted group curator module 101, shared/seeded logic module 102, curated logic module 103, collaboration module 104, extraction service module 106, machine learning/analytics module 108, and export service 109. The trusted group curator module 101 curates the members of the trusted groups provided through the platform. For example, several enterprises and/or users may wish to collaborate as a trusted group.

The shared/seeded logic module 102 may employ detection content shared (shared logic) by customers on the platform. In some embodiments, the logic is provided with a privacy setting. For example, such a privacy setting may be to use on the platform (e.g., in the training of the machine learning models), but to not share with other enterprise. Other example privacy settings include sharing with a trusted group only and sharing with all. The shared/seeded logic module 102, may also employ logic authored through the platform (see logic) for the use of all clients on the platform.

The curated logic module 103 provides curated logic that is natively authored or improved on the platform, or logic to which analytics such as efficacy, popularity, user rating, recommendation score, and so forth, has been added. In some embodiments, the curated logic module 103 may translate various vendor-specific formats of logic into a common language. In some embodiments, the curated logic module 103 provides machine-learning based and other forms of intelligence on the collected logic and applies such intelligence to the resulting logic.

The collaboration module 104 provides secure communications at a content detail level between members of trusted groups, and/or globally. In some embodiments, these communications are saved and auditable. The extraction service module 106 reads and exports content (e.g., logic) from participating enterprises.

The machine learning/analytics module 108 provides machine-learning driven suggestions of logic or other content, such as logic recommendations, based on a client's priorities, data sources, market trends, efficacy, ratings, and so forth. In some embodiments, client is provided their own set of recommendations rather than a one-size-fits-all. The machine learning/analytics module 108, provides detailed information on, for example, usage patterns, popularity, efficacy, usability, user reviews, ratings, rankings, and so forth.

The export services 109 provides a library of assets that include indexed/catalogued logic that is searchable or exportable. The export services 109 also assembles derived/curated logic into a common as well as vendor-specific formats for export into enterprise environments (e.g., a deployment).

Figure 1B:
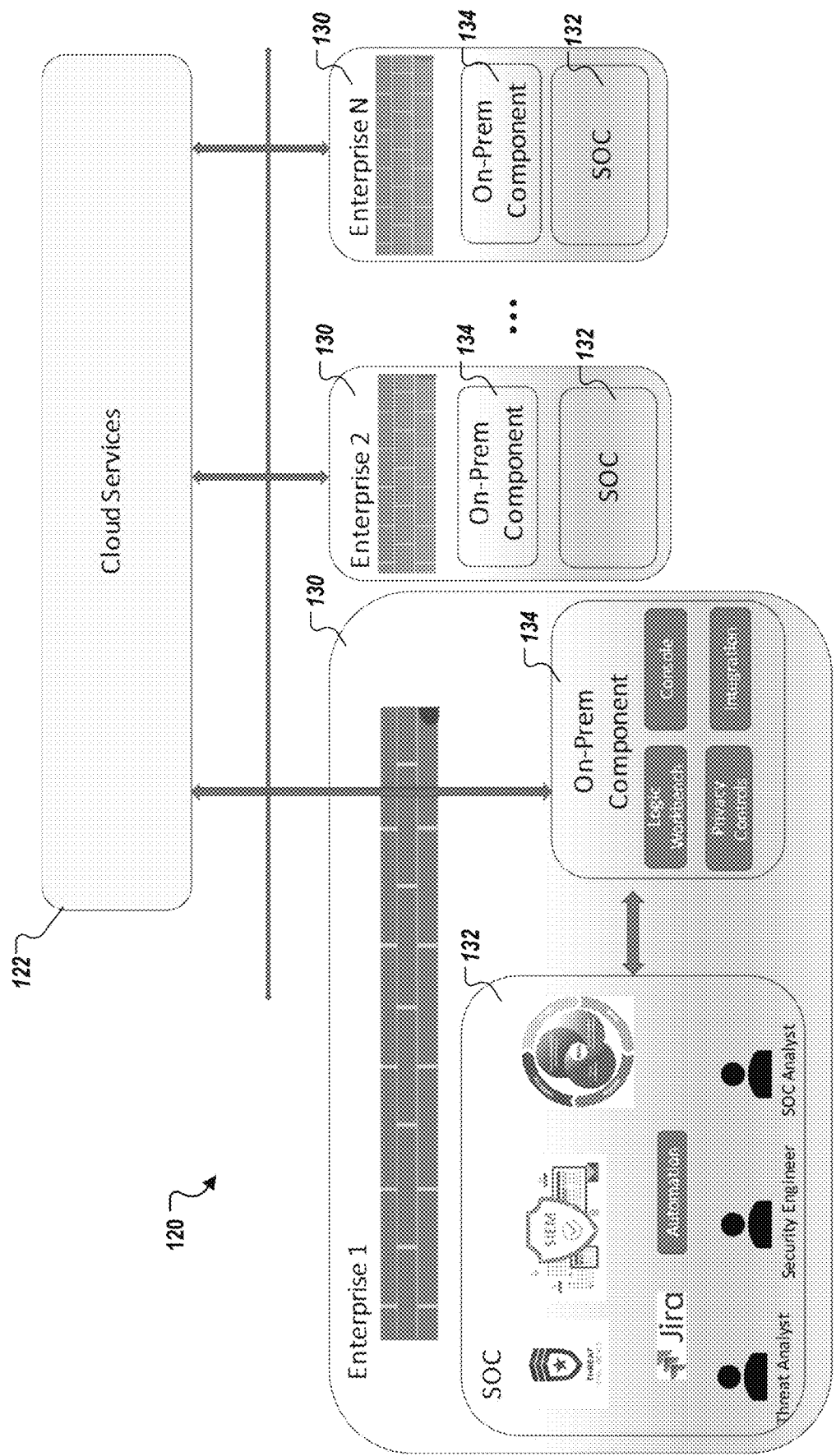
FIG. 1B depicts a non-limiting example of the describe system.

FIG. 1B depicts an example 120 of the describe system. As depicted the example system 120 includes cloud services 122 that are provided to various enterprises 130 (e.g., enterprises 1-N) through an on premises (on-prem) component 134. Each enterprise has a security operations center (SOC) 132. The described system allows security practitioners to sharing their understanding of the security rules (e.g., detection, triage) employed within their enterprise 130. For example, practitioners can share the rules that they are writing, how they are customizing these rules, as well as what are the sets of threats and detection rules in which they are particularly interested. In some embodiments, these rules are employed to make recommendations to various partners that are includes within a trusted group. (See FIG. 1C).

In some embodiments, an SOC is a centralized unit that deals with security issues on an organizational and technical level. In some embodiments, an SOC within a building or facility is a central location from where security practitioners, such as a threat analyst, security engineer, or SOC analyst, supervises the respective enterprise 130 with the aid of the described system. In some embodiments, an SOC is equipped for monitoring and detecting threats in the network and triage alerts and respond to incidents in the enterprise for those alerts.

In some embodiments, the on-prem component 134 is a device connected to a network. In some embodiments, the on-prem component 134 is a component installed on a device already connected to a network (e.g., a router, switch, gateway, etc.). In some embodiments, the on-prem component 134, is employed to scrape a security information and event management (SIEM) environment to extract relevant data regarding, for example, detected threats (alerts), false positives, security rules, and triage of encountered threats. As an example, the on-prem component 134 may receive data regarding any detected alerts, the percentage alerts that are promoted into incident, relevant data as to why the alerts were or were not promoted to incidents, and triage performed to mitigate the threat. The on-prem component 134 may collect or otherwise receive security data, such as logic rules; logic analytics; configurations and settings; alerts and incidents; threat analysis and adversaries; tactics, techniques, and procedures (TTPs), case management; privacy-compliant logic rules, logic analytics, SOC/STEM configurations and settings; alerts and incidents telemetry, shared threat analysis, adversaries and TTPs, shared case management, and so forth.

In some embodiments, the collected data is provided to the cloud services 122 from the on-prem components 134. Such collected data may include, for example, privacy-compliant logic rules, privacy-compliant logic analytics, privacy-compliant SOC/STEM configurations and settings, alerts and incidents telemetry, shared threat analysis, adversaries and TTPs, shared case management, and so forth. In some embodiments, the collected data is by the cloud services to train machine learning models, which can be employed determine to determine, for example, whether a detected threat is a false positive, updates to existing detection rules, new detection rules to add to a threat detection system, appropriate triage to employ to mitigate a detected threat, and so forth. In some embodiments, the machine learning models may further be trained with data specific to subsets of enterprises, such as a particular vertical(s), geography, size range, adversaries and TTP/s targeting those enterprises, data sources being collected, analyst reputation, and so forth. Such a trained model may be employed by the described system to determine or predict behaviors or an effectiveness, of a rule based. For example, a trained model can be employed to determine high-quality recommendations that solve a problem regarding what rule has the highest efficacy for an enterprise's environment. In some embodiments, the described system applies trained machine learning models to determine common factors, uses successes, other telemetries to facilitate collaboration among enterprises within a trusted group.

In some embodiments, the on-prem component 134 provides access to work flow tools deployed to the STEM environment that orchestrate the work that is happening in the SIEM. In some embodiments, the on-prem component extracts context from the various sources and provides this information to the cloud service 122. In some embodiments, the cloud service employs machine learning models trained with security data received from various enterprises as described above to provide rules to the enterprise 130, 140, and 150 according to parameters, such as threat type, vertical, and so forth. In some embodiments, the security data provide by the on-prem component 134 to feed to machine learning models is tokenize or encrypted to mask private data, and so on at the on-prem component 134. In some embodiments, the on-prem component 134 offsets the work flow of the customer to control, such as what sets of data are uploaded, and provides an audit trail so that clients have full visibility as to what has been provided to the cloud services 122. In some embodiments, a security administrator may access recommendations provided by the described system through the on-prem component 134 via, for example, a console. In some embodiments, such a console may provide an activity feed that includes, for example, relevant information from a peer's environment, a recommended rule set or update to a rule set.

Figure 1C:
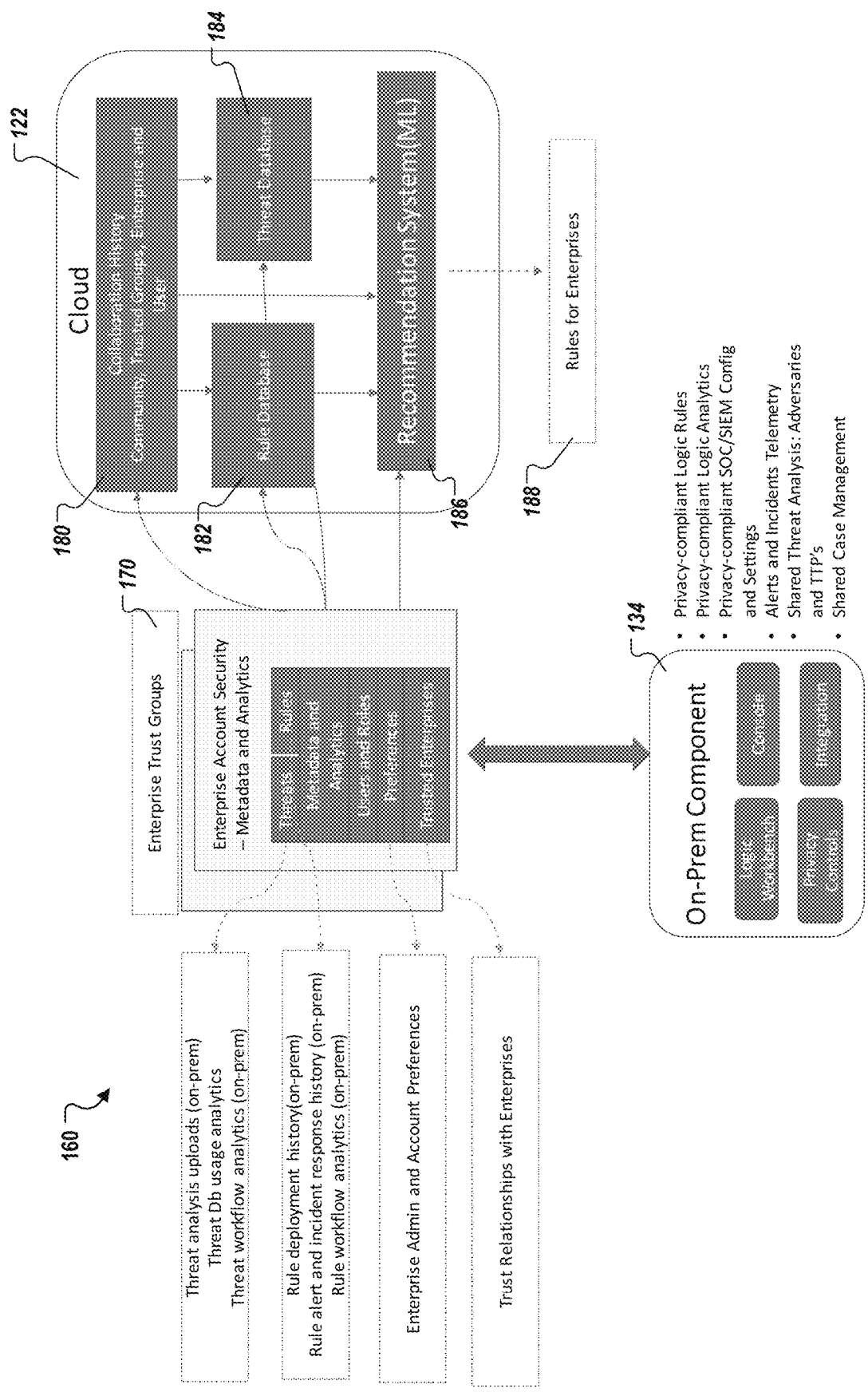
FIG. 1C depicts a non-limiting example of the describe system with components for a cloud service and the types of information that may be received from on-prem components.

FIG. 1C depicts an example 160 of the describe system with components for the cloud service 122 and the types of information that may be received from the on-prem components 122 deployed to various enterprises (not shown) that are members of enterprise trusted groups 170. As depicted, the cloud services ("cloud") 122 includes collaboration history 180, rule database 182, threat database 184, and recommendation system 186 that includes the machine learning component as described above. As described above, the on-prem component 134 provides the cloud 122 with information collected from the respective enterprises where each the on-prem component is deployed.

In some embodiments, this collected information can be characterized as threat data, which includes, for example, threat analysis uploads, threat database usage analytics, and threat workflow analytics; rules, which includes, for example, rule deployment history, rule alert and incident response history, and rule workflow analytics; meta data and other analytics, users and roles, preferences, such as enterprise administrator preferences and account preferences; trusted enterprises, which includes the trusted relationships with between enterprises.

Figure 2:
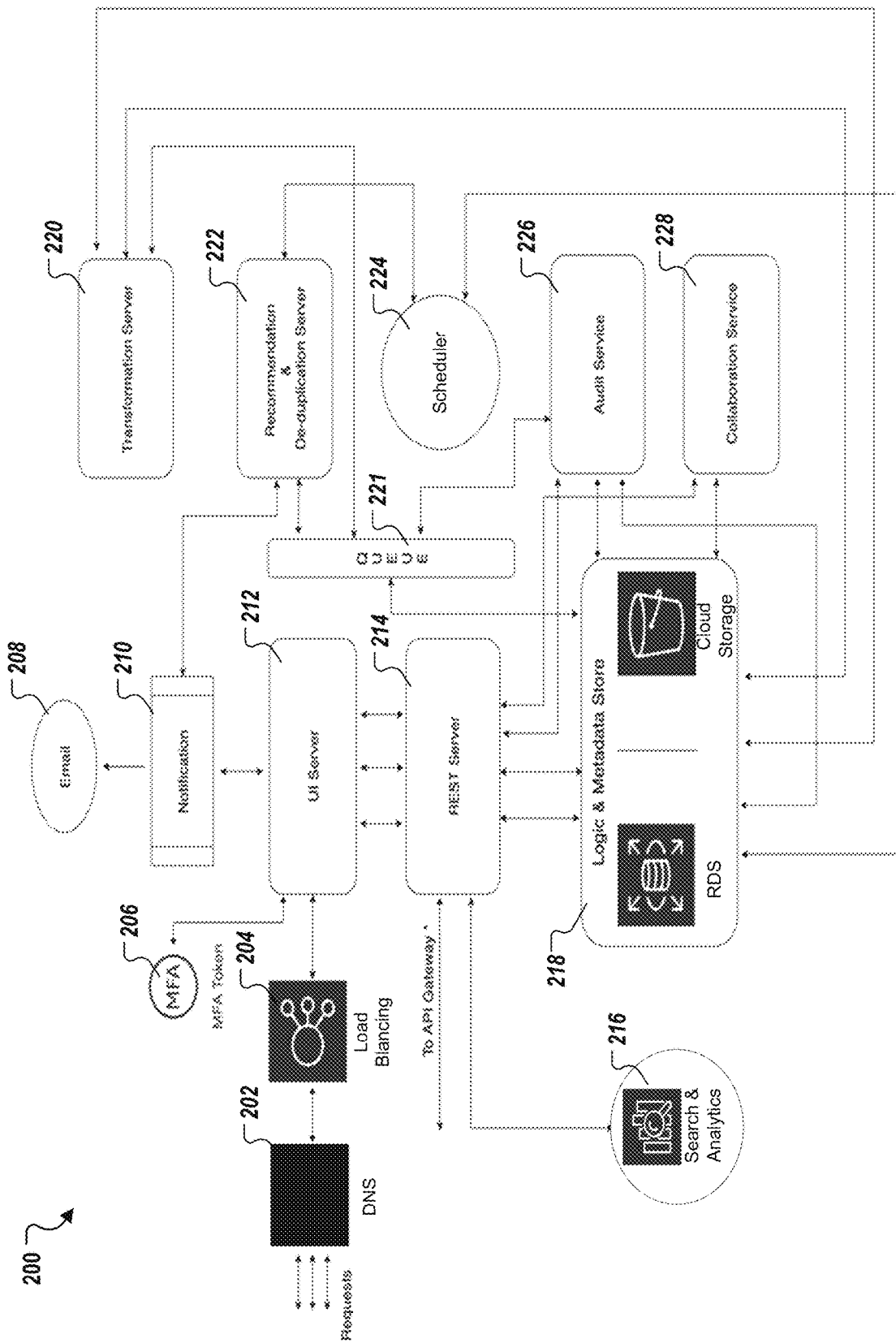
FIG. 2 depicts a non-limiting example architecture of the described system.

In some embodiments, the information provided by the collected information is include in the collaboration history 180 and stored in data storage systems. In some embodiments, the rules database 182 is employed to persist rules and configurations regarding such rules, provided by the on-prem components 134. In some embodiments, the threat database 184 is employed to persist threats detected by various enterprises and provided by the on-prem components 134. As described above, the collected data is provided to the recommendation system 186, which employed trained machine learning models to curate and improve the detection logic. In some embodiments, the machine-learning models are trained with active telemetry regarding a performance of the detection logic in an operating environment to model the efficacy and usefulness of the detection logic FIG. 2 depicts an example architecture 200 for the described system. As depicted, the example architecture 200 includes domain name system (DNS) service 202, load balancing service 204, notification module 210, UI server 212, representational state transfer (REST) server 214, search and analytics service 216, logic and metadata store 218, transformation server 220, recommendation and de-duplication server 222, scheduler 224, audit service 226, and collaboration service 228. The example architecture may be deployed through a computing environment, such as the example environments described in FIGS. 6A-6C. The various servers, modules, and data stores, of the architecture 200 may be deployed through dedicated and/or virtual devices, such as described in FIGS. 6A-6C. The various servers, modules, and data stores, of the architecture 200 may be deployed using cloud computing resources.

In some embodiments, the DNS service 202 resolves, or translates addresses (e.g., Internet Protocol (IP) addresses) as requested and communicates with other DNS services via web-based protocols. Example DNS services that may be employed within example architecture 200 include Amazon™ Route 53.

In some embodiments, the load balancing service 204 distributing incoming network traffic across a group of backend servers. Example load balancing services that may be employed within example architecture 200 include Elastic™ Load Balancing Service.

In some embodiments, the notification module 210 provides communication, such as email 208, to users of the described system. For example, the notification module 210 may provide a communication to security administrator that is accessible through a user device. Such user devices can include any appropriate type of computing device. Computing devices are described in greater detail below in the section describing the computing devices 602, 604, and 606 depicted in FIG. 6A.

Figure 3A:
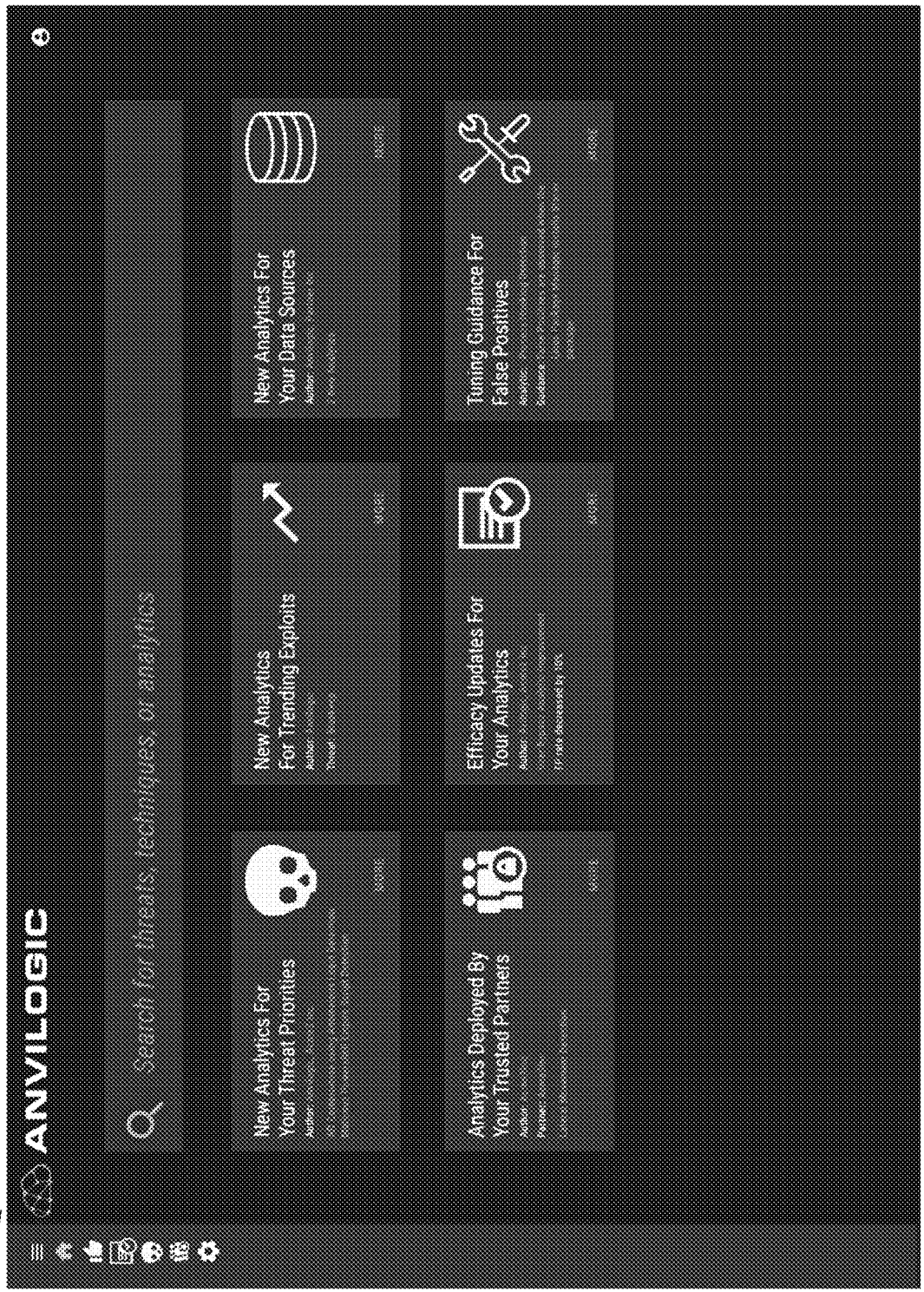
FIGS. 3A-3C depict various non-limiting example pages of a user interface (UI) by the described system.
Figure 3B:
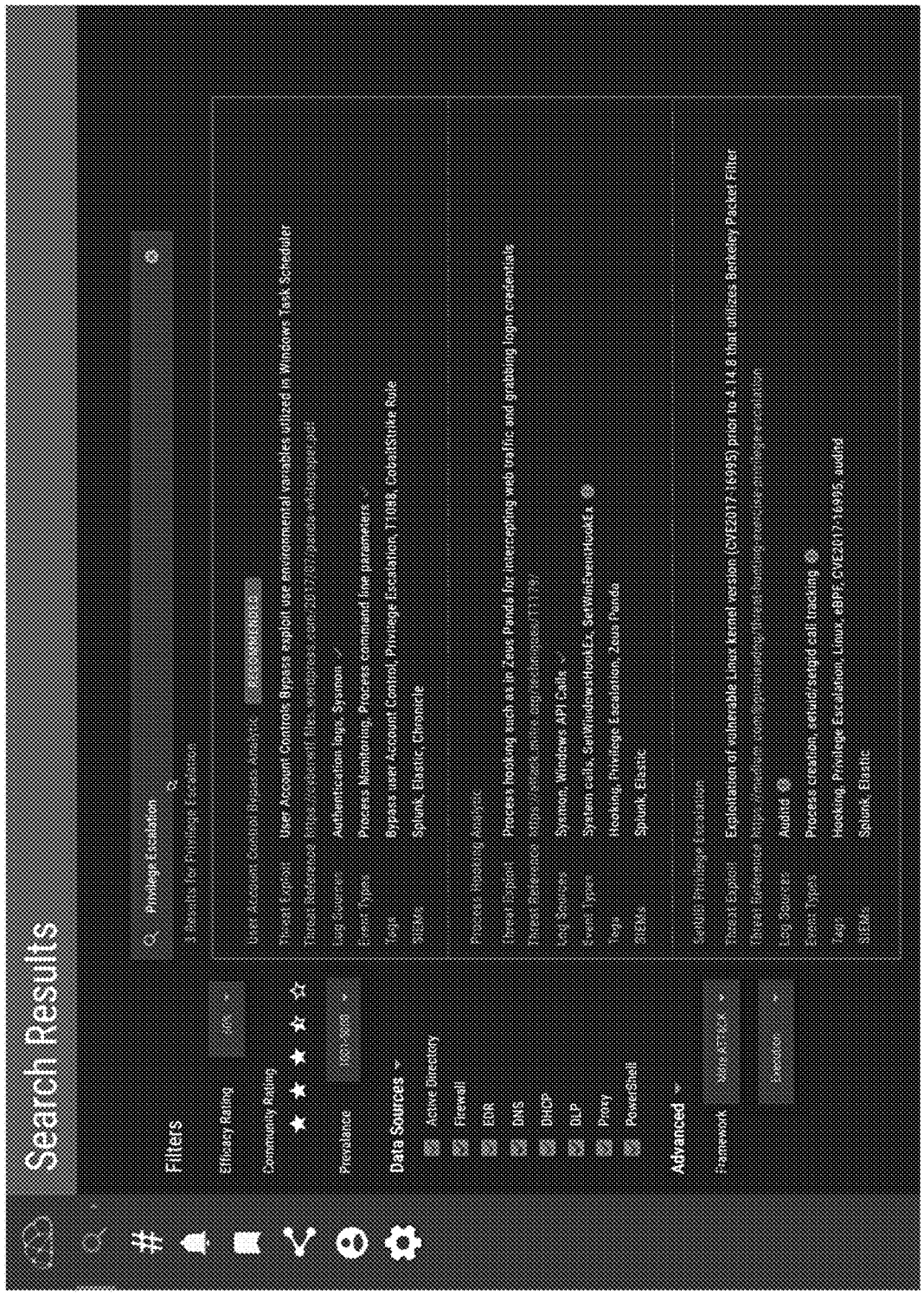
Figure 3C:
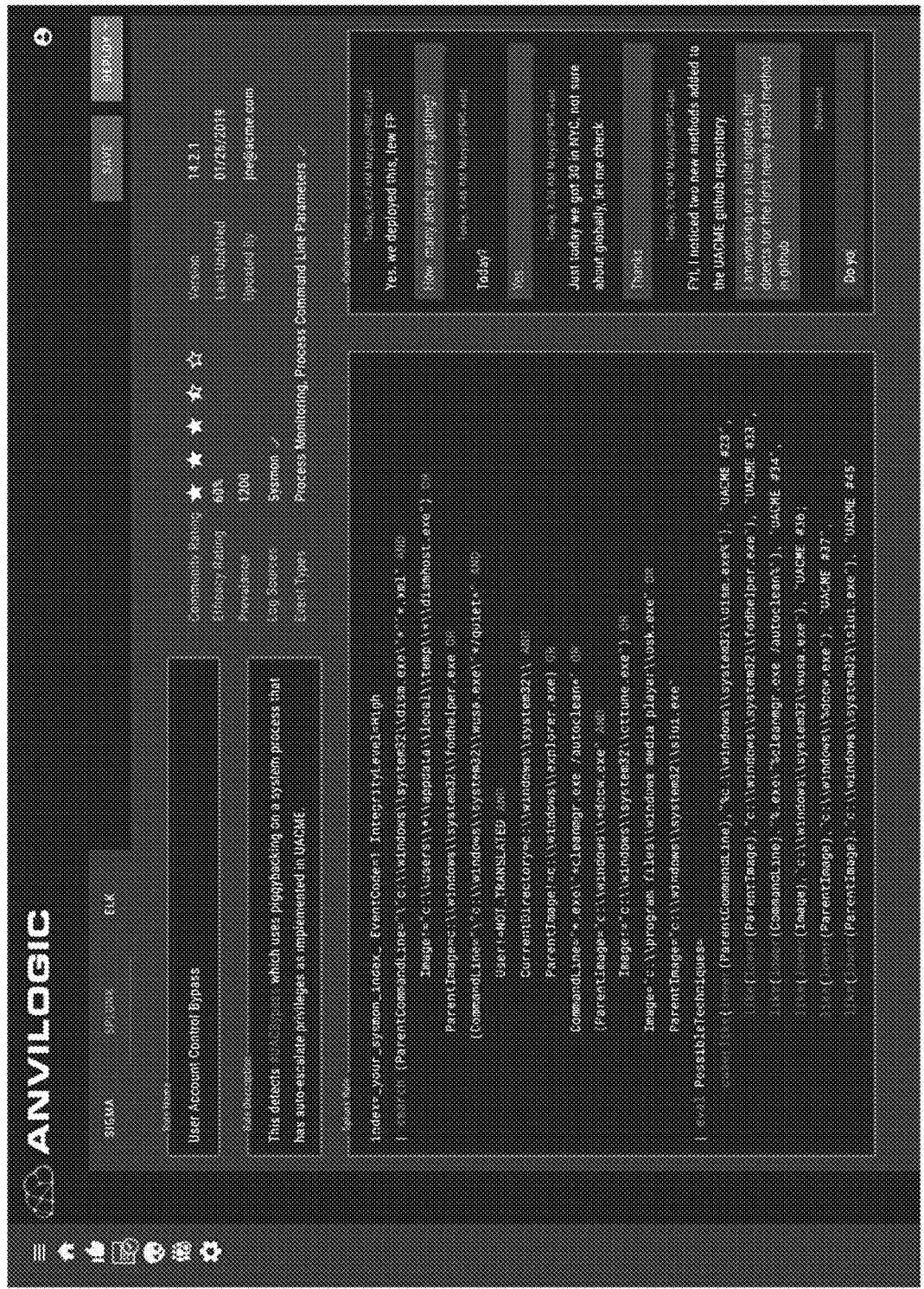

In some embodiments, the UI server provides a UI to user device such as described above. The provide US may include, for example, web pages viewable with a browser application. FIGS. 3A-3C (described below) depict example pages for a UI that can be provided by the described system.

In some embodiments, users may provide credentials, such a username and password, that can be authenticated to access the UI. In some embodiments, multi-factor authentication (MFA) through an MFA token 206 may be employed to authenticate users. Other types of authorization and user verification may also be employed by the described system.

In some embodiments, the REST server 214 is employed to provide requests and responses, to the various clients accessing the system, built around the transfer of representations of resources (e.g., the services provided through server and services 220-228).

In some embodiments, the search and analytics service 216 stores, searches, and analyzes big volumes of data quickly and in near real-time. Example search and analytics services that may be employed within example architecture 200 include Elasticsearch™. For example, the Elasticsearch service may be employed to provide search for the logic and content in the system.

In some embodiments, the logic and metadata store 218 are employed to store information. In some embodiments, the logic and metadata store 218 include relational database services (RDS), such as Amazon RDS. In some embodiments, the logic and metadata store 218 include cloud-based storage, such as Amazon S3. Data stores are described in greater detail below in the data store section.

In some embodiments, the scheduler 224 controlling unattended background program execution of job. Example schedulers that may be employed within example architecture 200 include Quartz™.

In some embodiments, the UI server 212 communicates to the REST sever 214 for requests from a user device (e.g., through a browser application). For example, a user may be presented, though a user device, a login screen. The user may authenticate via MFA via an MFA token 206. Upon successful login, a user will be entitled to, for example, view the information persisted to the logic and metadata store 218 through the provide UI. In some embodiments, the UI Server 212 communicates with the notification service 210 for configuring notifications, such as email 208, as per users' preference. In some embodiments, the REST Server 214 handles requests from the UI Server 212 and the other interfaces as well as requests from an API gateway (e.g., Amazon™ API Gateway). In some embodiments, requests flowing through REST are in JavaScript Object Notation (JSON) format. In some embodiments, there is a protocol contract between the REST and different modules, such as the transformation server 220, the recommendation and de-duplication server 222, the audit service 226, and the collaboration service 228.

In some embodiments, the transformation server 220 picks up uploaded logic from a queue 221 and converts them into specific formats and adds metadata for the logic. In some embodiments, the recommendation and deduplication server 222 retrieves transformed logic from the queue 221 and assigns recommendation weights for the logic. In some embodiments, the recommendation and deduplication server 222 performs de-duplication of logic to avoid multiple logics for the same solution. In some embodiments, the recommendation and deduplication server 222 is run periodically as scheduled by the scheduler 224.

In some embodiments, the audit service 226 tracks actions performed by users. In some embodiments, records generated by the audit service 226 are stored in the logic and metadata store 218. In some embodiments, these records are stored for a configurable amount of time after they may be download by, for example, an administrator.

In some embodiments, the collaboration service 228 exchanges logic between various users of the described system.

In some embodiments, the recommendation and de-duplication server 222 processes the collected incident report data to determined enriched logic, which may include detection rules, to provide to various enterprises based on provide criteria. For example, an enterprise may provide information regarding its size, location, and vertical to the recommendation and de-duplication server 222, which determines a set of detection rules based on the criteria. In some embodiments, the recommendation and de-duplication server 222 processes the provided criteria through a machine-learning model to determine a set of detection rules.

Example User Interface Pages

FIGS. 3A-3C depict various example pages provide by the described system via, for example, the UI server 212.

FIG. 3A depicts an example home page 300 for the described system. The example home page 300 can be employed to provided, for example, detection rules determined based on the criteria provided by the enterprises (e.g., security administration) or based on general information the system. In some embodiments, the home page 300 may also recommend detection rules based on observed context and relevance. In some embodiments, home page 300 may recommend relevant updates made to existing detection rules or new detection rules employed by trusted enterprises.

FIG. 3B depicts an example search results 310 for the described system. The example usage page 310 provides search information regarding various threats, incidents, detection rules, triage employed, and so forth.

FIG. 3C depicts an example of a recommended rule in response to an enterprise analyst query page 320 for the described system. The rule is for detecting a specific type of threat procedure the "User Account Control Bypass".

Example Processes

Figure 4:
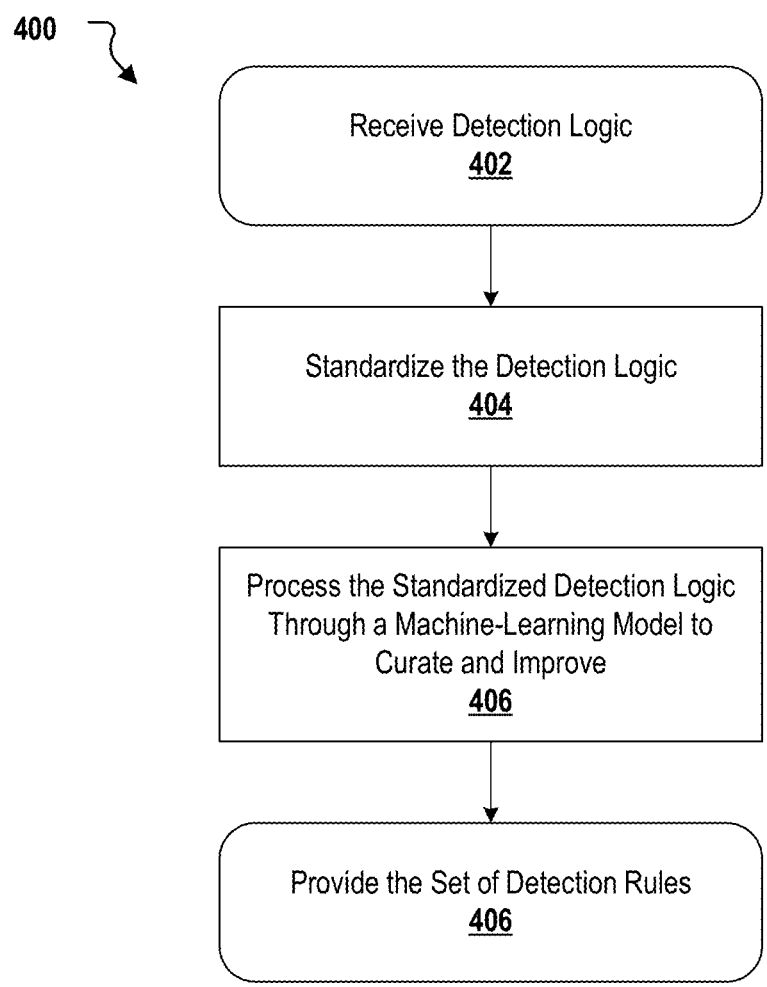
FIG. 4 depict flowcharts of a non-limiting examples process that can be implemented by embodiments of the present disclosure.

FIG. 4 depicts a flowchart of an example process 400 that can be implemented by embodiments of the present disclosure. The example process 400 can be implemented by the components of the described system, such as described above in FIGS. 1A-1C and FIG. 2. The example process 400 generally shows in more detail how detection logic can be shared through a cloud-based exchange platform through the described system.

For clarity of presentation, the description that follows generally describes the example process 400 in the context of FIGS. 1-3C, and 5-6C. However, it will be understood that the process 400 may be performed, for example, by any other suitable system, environment, software, and hardware, or a combination of systems, environments, software, and hardware as appropriate. In some embodiments, various operations of the process 400 can be run in parallel, in combination, in loops, or in any order.

At 402, detection logic is received from an enterprise. In some embodiments, the detection logic is provided by a software service installed at the enterprise. In some embodiments, the detection logic is provided by a security appliance installed at the enterprise. In some embodiments, the security appliance extracts the detection logic from various sources. In some embodiments, the security appliance masks confidential or private data included in the detection logic. In some embodiments, the security appliance masks data by tokenizing or encrypting the data. In some embodiments, the detection logic is received by a cloud-based service. In some embodiments, the detection logic is non-attributable to the enterprise. In some embodiments, the detection logic is attributable to the enterprise based on a permission provide by the enterprise. In some embodiments, the detection logic is non-attributability to the enterprise. In some embodiments, the detection logic includes a plurality of detection rules associated with cyber threat detection. In some embodiments, the detection rules include triage for false positives. In some embodiments, the detection rules include logic to mitigate or eradicate the cyber threat. In some embodiments, the detection logic includes customizations to the detection rules. In some embodiments, the detection logic includes context data regarding a deployment environment. In some embodiments, the detection logic includes incident response data. From 402, the process 400 proceeds to 404.

At 404, the detection logic is standardized based on a plurality of security frameworks to define attacks and classify protection techniques. In some embodiments, standardizing the detection logic comprises translating vendor-specific formats into a common language. In some embodiments, the protection techniques include detection rules. From 404, the process 400 proceeds to 406.

At 406, the standardized detection logic is processed through a machine-learning model to curate and improve the detection logic. The machine-learning model having been trained with active telemetry regarding a performance of the detection logic in an operating environment. In some embodiments, before processing the standardized detection logic through the machine-learning model: the active telemetry regarding the performance of the detection logic in the operating environment is received from at least one other enterprise. In some embodiments, the operating environment is associated with the at least one other enterprise. In some embodiments, the machine-learning model is trained with the active telemetry to model the efficacy and usefulness of the detection logic. In some embodiments, environmental and preferential data is received from the at least one other enterprise and the machine-learning model is rained with the environmental and preferential data. In some embodiments, the environmental and preferential data includes data sources in an environment associated with the at least one other enterprise, security priorities vis-à-vis a framework, market trends, or efficacy ratings. In some embodiments, behavior data regarding user interaction with the detection logic is received from the at least one other enterprise and the machine-learning model is trained with the behavior data. In some embodiments, the behavior data comprises usage of the detection logic, topics of interest regarding the detection, and popularity metric for the detection. In some embodiments, curating and improving the detection logic comprises generating conversion and conformance of the detection logic in a vendor-neutral format. In some embodiments, curating and improving the detection logic comprises testing the detection logic for validity and efficacy. In some embodiments, the efficacy of the detection logic includes a high signal and a low rate of false positives. In some embodiments, curating and improving the detection logic comprises curating for better efficiency in a construction of the detection logic and fine-tuning for a precision of the detection logic in detecting valid threats. In some embodiments, curating and improving the detection logic comprises converting the detection logic to at least one end-user STEM tool format. In some embodiments, the machine-learning model is trained with the standardized detection logic and the active telemetry. In some embodiments, the active telemetry includes common factors, and successful uses of the protection techniques. In some embodiments, the active telemetry and the detection logic are analyzed to determine metadata regarding the attacks and respective protection techniques and the metadata is provide to the interface. In some embodiments, the metadata includes usage patterns, search terms, popularity, efficacy, usability, user reviews, ratings, or rankings. From 406, the process 400 proceeds to 408.

At 408, the standardized detection logic and the active telemetry are provided to an interface. In some embodiments, the standardized detection logic and the active telemetry are provided to the interface in a common format. In some embodiments, the standardized detection logic and the active telemetry are provided to the interface in vendor-specific format. In some embodiments, the standardized detection logic and the active telemetry are provided only to member enterprises of a trusted peer group as determined by the enterprise. In some embodiments, the interface comprises a user-interface. In some embodiments, the user-interface is provided through a console. From 408, the process 400 ends.

Processing Devices and Processors

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 5:
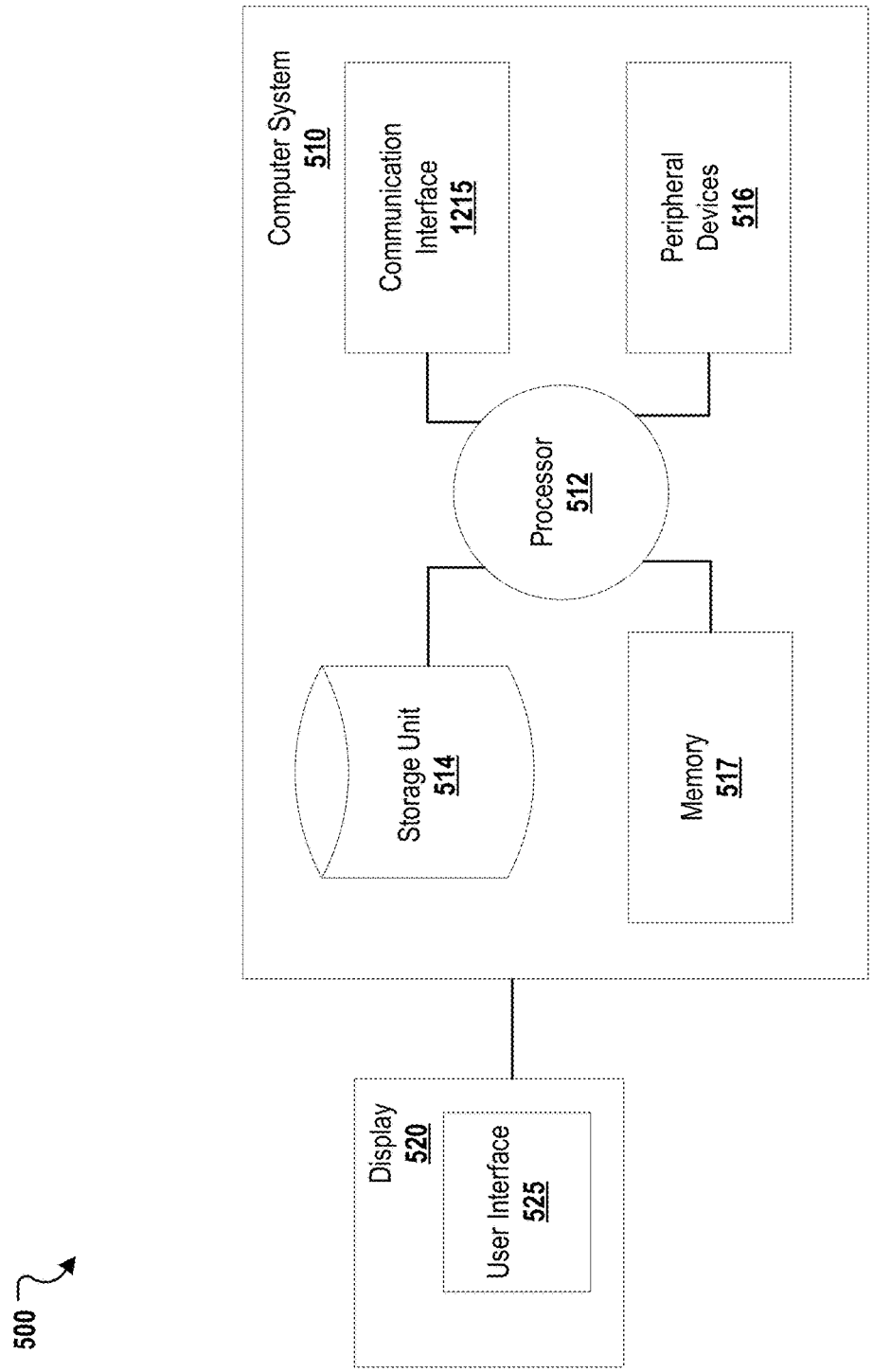
FIG. 5 depicts a non-limiting example a computer system that can be programmed or otherwise configured to implement methods or systems of the present disclosure.

Computer control systems are provided herein that can be used to implement the platforms, systems, media, and methods of the disclosure. FIG. 5 depicts an example a computer system 510 that can be programmed or otherwise configured to implement platforms, systems, media, and methods of the present disclosure. For example, the computing device 510 can be programmed or otherwise configured to display a user-interface or application provided by the described system.

In the depicted embodiment, the computing device 510 includes a CPU (also "processor" and "computer processor" herein) 512, which is optionally a single core, a multi core processor, or a plurality of processors for parallel processing. The computing device 510 also includes memory or memory location 517 (e.g., random-access memory, read-only memory, flash memory), electronic storage unit 514 (e.g., hard disk), communication interface 515 (e.g., a network adapter) for communicating with one or more other systems, and peripheral devices 516, such as cache, other memory, data storage and/or electronic display adapters. In some embodiments, the memory 517, storage unit 514, interface 515 and peripheral devices 516 are in communication with the CPU 512 through a communication bus (solid lines), such as a motherboard. The storage unit 514 comprises a data storage unit (or data repository) for storing data. The computing device 510 is optionally operatively coupled to a computer network, such as the network 610 depicted and described in FIG. 6A, with the aid of the communication interface 515. In some embodiments, the computing device 510 is configured as a back-end server deployed within the described system.

In some embodiments, the CPU 512 can execute a sequence of machine-readable instructions, which can be embodied in a program or software. The instructions may be stored in a memory location, such as the memory 517. The instructions can be directed to the CPU 512, which can subsequently program or otherwise configure the CPU 512 to implement methods of the present disclosure. Examples of operations performed by the CPU 512 can include fetch, decode, execute, and write back. In some embodiments, the CPU 512 is part of a circuit, such as an integrated circuit. One or more other components of the computing device 510 can be optionally included in the circuit. In some embodiments, the circuit is an application specific integrated circuit (ASIC) or a FPGA.

In some embodiments, the storage unit 514 stores files, such as drivers, libraries and saved programs. In some embodiments, the storage unit 514 stores user data, e, such as detection logic; analysis of various threats that have been encountered by an enterprise; metadata regarding triage performed to mitigate threats, false positives, and performance metrics, and so forth. In some embodiments, the computing device 510 includes one or more additional data storage units that are external, such as located on a remote server that is in communication through an intranet or the internet.

In some embodiments, the computing device 510 communicates with one or more remote computer systems through a network. For instance, the computing device 510 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants, such as depicted in FIG. 6A. In some embodiments, a user can access the computing device 510 via a network.

In some embodiments, the platforms, systems, media, and methods as described herein are implemented by way of machine (e.g., computer processor) executable code stored on an electronic storage location of the computing device 510, such as, for example, on the memory 517 or the electronic storage unit 514. In some embodiments, the CPU 512 is adapted to execute the code. In some embodiments, the machine executable or machine readable code is provided in the form of software. In some embodiments, during use, the code is executed by the CPU 512. In some embodiments, the code is retrieved from the storage unit 514 and stored on the memory 517 for ready access by the CPU 512. In some situations, the electronic storage unit 514 is precluded, and machine-executable instructions are stored on the memory 517. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with an electronic display 520. In some embodiments, the electronic display 520 provides a UI 525 that depicts various screen, such as the examples depicted in FIGS. 3A-3C.

FIG. 6A depicts an example environment 600 that can be employed to execute embodiments of the present disclosure. The example system 600 includes computing devices 602, 604, 606, a back-end system 630, and a network 610. In some embodiments, the network 610 includes a local area network (LAN), wide area network (WAN), the Internet, or a combination thereof, and connects web sites, devices (e.g., the computing devices 602, 604, and 606) and back-end systems (e.g., the back-end system 630). In some embodiments, the network 610 includes the Internet, an intranet, an extranet, or an intranet and/or extranet that is in communication with the Internet. In some embodiments, the network 610 includes a telecommunication or a data network. In some embodiments, the network 610 can be accessed over a wired or a wireless communications link. For example, mobile computing devices (e.g., the smartphone device 602 and the tablet device 606), can use a cellular network to access the network 610.

The described system may be employed within the example environment 600 to, for example, employ machine learning/AI techniques for processing detection logic (e.g., detection rules) through a machine-learning algorithm to curate and improve the detection logic. In some embodiments, the machine-learning model is trained with active telemetry regarding a performance of the detection logic in an operating environment to model the efficacy and usefulness of the detection logic. In some embodiments, the machine-learning model is trained with behavior data regarding user interaction with the detection logic.

In some examples, the users 622, 624, and 626 interact with the described system through a graphical user interface (GUI), such as depicted in FIGS. 3A-3C, or application that is installed and executing on their respective computing devices 602, 604, and 606. In some examples, the computing devices 602, 604, and 606 provide viewing data to screens with which the users 622, 624, and 626, can interact. In some embodiments, the computing devices 602, 604, 606 are sustainably similar to computing device 510 depicted in FIG. 5. The computing devices 602, 604, 606 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 602, 604, and 606 are depicted in FIG. 6A for simplicity. In the depicted example environment 600, the computing device 602 is depicted as a smartphone, the computing device 604 is depicted as a tablet-computing device, and the computing device 606 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In the depicted example environment 600, the back-end system 630 includes at least one server device 632 and at least one data store 634. In some embodiments, the device 632 is sustainably similar to computing device 510 depicted in FIG. 5. In some embodiments, the back-end system 630 may include server-class hardware type devices. In some embodiments, the server device 632 is a server-class hardware type device. In some embodiments, the back-end system 630 includes computer systems using clustered computers and components to act as a single pool of seamless resources when accessed through the network 610. For example, such embodiments may be used in data center, cloud computing, storage area network (SAN), and network attached storage (NAS) applications. In some embodiments, the back-end system 630 is deployed using a virtual machine(s). In some embodiments, the data store 634 is a repository for persistently storing and managing collections of data. Example data store that may be employed within the described system include data repositories, such as a database as well as simpler store types, such as files, emails, and so forth. In some embodiments, the data store 634 includes a database. In some embodiments, a database is a series of bytes or an organized collection of data that is managed by a database management system (DBMS).

In some embodiments, the at least one server system 632 hosts one or more computer-implemented services, such as described above in FIGS. 1A-1C and FIG. 2, provided by the described system that users 622, 624, and 626 can interact with using the respective computing devices 602, 604, and 606.

Figure 6B:
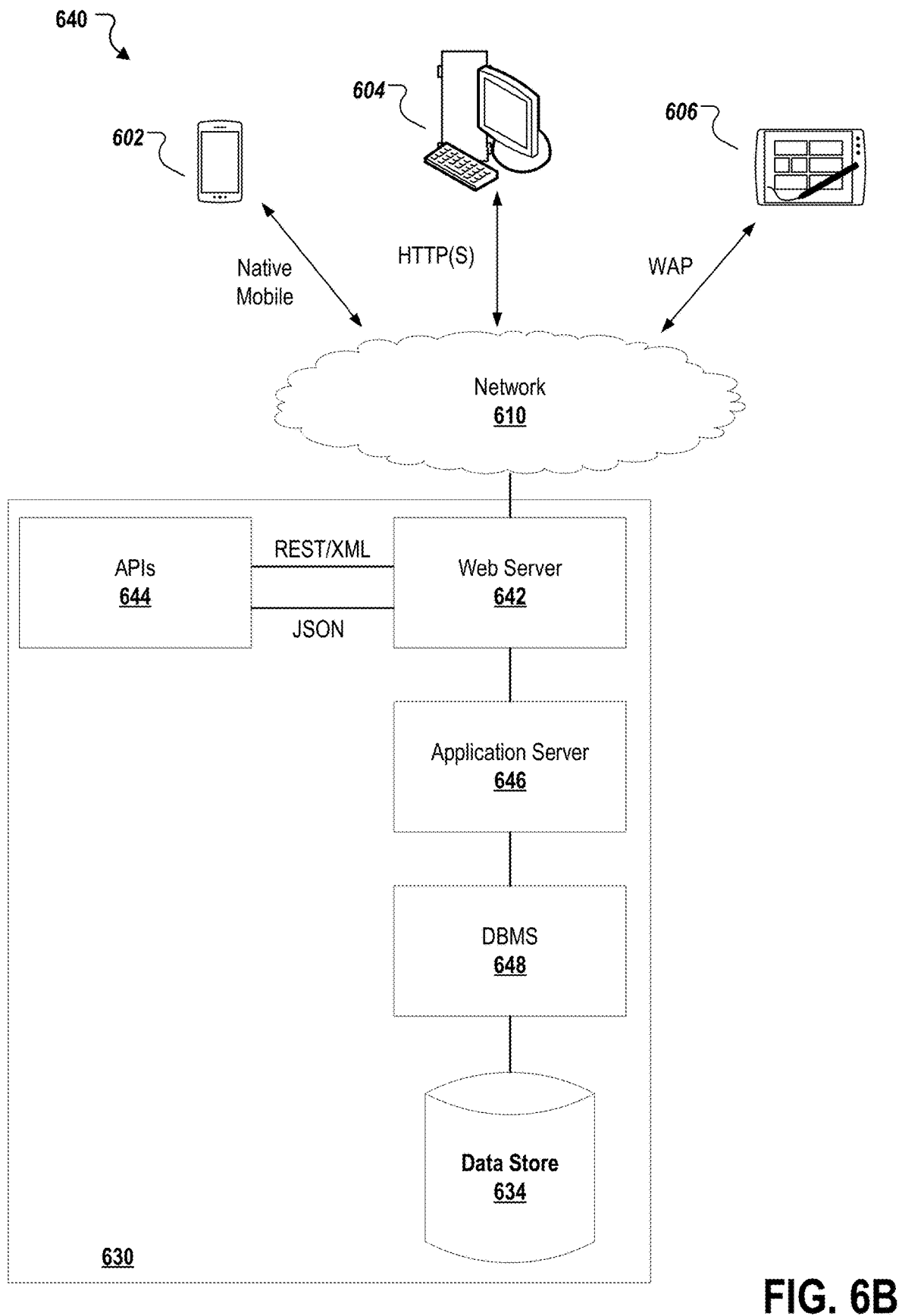
FIG. 6B depicts a non-limiting example application provision system that can be provided through an environment and employed to execute embodiments of the present disclosure.

FIG. 6B depicts an example application provision system 640 that can be provided through an environment, such as the example environment 600 and employed to execute embodiments of the present disclosure. As depicted, the example application provision system 640 includes the back-end system 630 configured to include one or more data stores 634 accessed by a DBMS 648. Suitable DBMSs include Firebird, MySQL, PostgreSQL, SQLite, Oracle Database, Microsoft SQL Server, IBM DB2, IBM Informix, SAP Sybase, SAP Sybase, Teradata, and the like. As depicted, the example application provision system 640 includes the back-end system 630 configured to include one or more application severs 646 (such as Java servers, .NET servers, PHP servers, and the like) and one or more web servers 642 (such as Apache, IIS, GWS and the like). The web server(s) 642 optionally expose one or more web services via an API 644 via the network 610. In some embodiments, the example application provision system 640 provides browser-based or mobile native UIs to the computing devices 602, 604, 606.

Figure 6C:
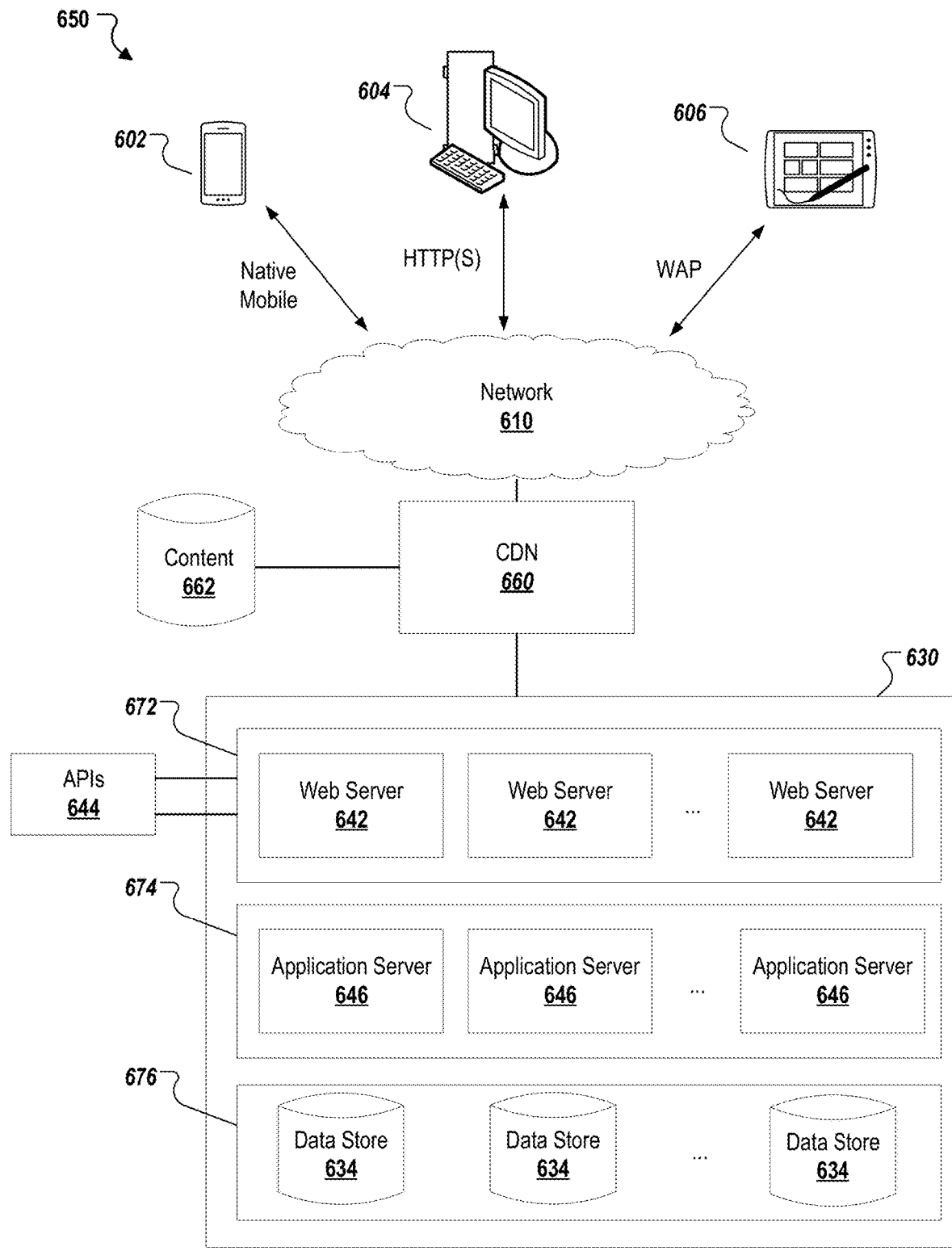
FIG. 6C depicts a non-limiting example cloud-based architecture of an application provision system that can be provided through an environment and employed to execute embodiments of the present disclosure.

FIG. 6C depicts an example cloud-based architecture of an application provision system 650 that can be provided through an environment, such as the example environment 600, and employed to execute embodiments of the present disclosure. The application provision system 650 includes the back-end system 630 configured to include elastically load balanced, auto-scaling web server resources 672, application server resources 674, as well as synchronously replicated stores 676. In some embodiment, of the example cloud-based architecture of an application provision system 650, content 662 of services are provided through a content delivery network (CDN) 660 coupled with the back-end system 630. In some embodiments, a CDN is a geographically distributed network of proxy servers and respective data centers that provides high availability and high performance through distributing the service spatially relative to the receiving devices, such as commuting devices 602, 604, and 606.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to curate and improve detection logic, such as a set of detection rules, that has been received from an enterprise and standardized to define attacks and classify protection techniques according to various security frameworks. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received active telemetry regarding a performance of detection logic in an operating environment associated with an enterprise. Such detection logic may include, for example, detection rules, threat information, triage information, contextual information and so forth. Moreover, as described above, these algorithms can be continuously trained/retrained using real-time data as it is determined or otherwise acquired by the described system. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing-based. In some embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the scope of the present disclosure. It should be understood that various alternatives to the embodiments of the subject matter described herein may be employed.

What is claimed is:

1. A computer-implemented method for sharing detection logic through a cloud-based exchange platform, the method being executed by one or more processors and comprising:
receiving detection logic from an enterprise;
standardizing the detection logic based on a plurality of security frameworks to define attacks and classify protection techniques;
processing the standardized detection logic through a machine-learning model to curate and improve the detection logic, the machine-learning model trained with active telemetry regarding a performance of the detection logic in an operating environment;
providing the standardized detection logic and the active telemetry to an interface; and before processing the standardized detection logic through the machine-learning model:
receiving, from at least one other enterprise, the active telemetry regarding the performance of the detection logic in the operating environment, wherein the operating environment is associated with the at least one other enterprise; and
training the machine-learning model with the active telemetry to model the efficacy and usefulness of the detection logic.

2. The method of claim 1, comprising:
receiving, from the at least one other enterprise, environmental and preferential data; and training the machine-learning model with the environmental and preferential data.

3. The method of claim 2, wherein the environmental and preferential data includes data sources in an environment associated with the at least one other enterprise, security priorities vis-à-vis a framework, market trends, or efficacy ratings.

4. The method of claim 1, comprising:
receiving, from the at least one other enterprise, behavior data regarding user interaction with the detection logic; and
training the machine-learning model with the behavior data.

5. The method of claim 4, wherein the behavior data comprises usage of the detection logic, topics of interest regarding the detection, and popularity metric for the detection.

6. The method of claim 1, wherein curating and improving the detection logic comprises generating conversion and conformance of the detection logic in a vendor-neutral format.

7. The method of claim 1, wherein curating and improving the detection logic comprises testing the detection logic for validity and efficacy, and wherein the efficacy of the detection logic includes a high signal and a low rate of false positives.

8. The method of claim 1, wherein curating and improving the detection logic comprises curating for better efficiency in a construction of the detection logic and fine-tuning for a precision of the detection logic in detecting valid threats.

9. The method of claim 1, wherein curating and improving the detection logic comprises converting the detection logic to at least one end-user Security Incident and Event Management (SIEM) tool format.

10. The method of claim 1, comprising:
training the machine-learning model with the standardized detection logic and the active telemetry.

11. The method of claim 1, wherein the active telemetry includes common factors, and successful uses of the protection techniques.

12. The method of claim 1, comprising:
analyzing the active telemetry and the detection logic to determine metadata regarding the attacks and respective protection techniques; and
providing the metadata to the interface.

13. The method of claim 12, wherein the metadata includes usage patterns, search terms, popularity, efficacy, usability, user reviews, ratings, or rankings.

14. The method of claim 1, wherein the protection techniques include detection rules.

15. The method of claim 1, wherein the detection logic is provided by a software service installed at the enterprise.

16. The method of claim 1, wherein the detection logic is provided by a security appliance installed at the enterprise.

17. The method of claim 16, wherein the security appliance masks confidential or private data included in the detection logic.

18. The method of claim 17, wherein the security appliance masks data by tokenizing or encrypting the data.

19. The method of claim 1, wherein the detection logic is received by a cloud-based service.

20. The method of claim 1, wherein the detection logic is non-attributable to the enterprise.

21. The method of claim 1, wherein the detection logic is attributable to the enterprise based on a permission provided by the enterprise.

22. The method of claim 1, wherein the standardized detection logic and the active telemetry are provided only to member enterprises of a trusted peer group as determined by the enterprise.

23. The method of claim 1, wherein the detection logic includes a plurality of detection rules associated with cyber threat detection.

24. The method of claim 23, wherein the detection rules include triage for false positives.

25. The method of claim 23, wherein the detection rules include logic to mitigate or eradicate the cyber threat.

26. The method of claim 23, wherein the detection logic includes customizations to the detection rules.

27. The method of claim 1, wherein the detection logic includes context data regarding a deployment environment or incident response data.

28. A system for sharing detection logic through a cloud-based exchange, comprising:
an interface;
one or more processors; and
a computer-readable storage device coupled to the one or more processors and having instructions stored thereon which, when executed by the one or more processors, cause the one or more processors to perform operations that provide the cloud-based exchange, the operations comprising:
receiving, detection logic from an enterprise;
standardizing the detection logic based on a plurality of security frameworks to define attacks and classify protection techniques;
processing the standardized detection logic through a machine-learning model to curate and improve the detection logic, the machine-learning model trained with active telemetry regarding a performance of the detection logic in an operating environment;
providing the standardized detection logic and the active telemetry to the interface; and before processing the standardized detection logic through the machine-learning model:
receiving, from at least one other enterprise, the active telemetry regarding the performance of the detection logic in the operating environment, wherein the operating environment is associated with the at least one other enterprise; and
training the machine-learning model with the active telemetry to model the efficacy and usefulness of the detection logic.

29. One or more non-transitory computer-readable storage media coupled to one or more processors and having instructions stored thereon which, when executed by the one or more processors, cause the one or more processors to perform operations comprising:
receiving detection logic from an enterprise;
standardizing the detection logic based on a plurality of security frameworks to define attacks and classify protection techniques;
processing the standardized detection logic through a machine-learning model to curate and improve the detection logic, the machine-learning model trained with active telemetry regarding a performance of the detection logic in an operating environment;
providing the standardized detection logic and the active telemetry to an interface; and before processing the standardized detection logic through the machine-learning model:
receiving, from at least one other enterprise, the active telemetry regarding the performance of the detection logic in the operating environment, wherein the operating environment is associated with the at least one other enterprise; and
training the machine-learning model with the active telemetry to model the efficacy and usefulness of the detection logic.

* * * * *